US 6,742,649 B2

(12) United States Patent
Karlsson

(10) Patent No.: US 6,742,649 B2
(45) Date of Patent: Jun. 1, 2004

(54) NON-HORIZONTAL CONVEYOR FOR FEEDING OBJECTS

(75) Inventor: Jerry Karlsson, Lund (SE)

(73) Assignee: Scan Coin Industries AB, Malmö (SE)

( * ) Notice: Subject to any disclaimer, the term of this patent is extended or adjusted under 35 U.S.C. 154(b) by 0 days.

(21) Appl. No.: 10/225,246

(22) Filed: Aug. 22, 2002

(65) Prior Publication Data

US 2004/0035682 A1 Feb. 26, 2004

(51) Int. Cl.[7] .............................................. B65G 15/00
(52) U.S. Cl. .................... 198/836.2; 198/396; 198/443; 198/454; 198/860.3
(58) Field of Search .................... 198/860.3, 860.5, 198/836.2, 396, 443, 454

(56) References Cited

U.S. PATENT DOCUMENTS

| | | | | | |
|---|---|---|---|---|---|
| 1,361,294 | A | * | 12/1920 | Tschache | 198/836.2 |
| 2,221,236 | A | * | 11/1940 | Gay | 198/836.2 |
| 3,067,852 | A | * | 12/1962 | Barr | 198/381 |
| 4,366,896 | A | * | 1/1983 | Tomosue | 198/384 |
| 4,588,069 | A | * | 5/1986 | Sticht | 198/443 |
| 4,593,805 | A | * | 6/1986 | Huddle | 198/381 |
| 5,062,521 | A | * | 11/1991 | Hockman | 198/389 |
| 5,394,972 | A | * | 3/1995 | Aidlin et al. | 198/393 |

FOREIGN PATENT DOCUMENTS

DE 2107982 A 8/1972

* cited by examiner

Primary Examiner—Richard Ridley
(74) Attorney, Agent, or Firm—Steven S. Payne

(57) ABSTRACT

A non-horizontal conveyor for feeding objects has a conveyor belt, a first pulley at a first end forming a loading area of the conveyor, and a second pulley at a second end forming a feeding area of the conveyor. The conveyor also has a conveyor cover having an upper part and a lower part, wherein the upper part extends from the second pulley towards the first pulley, thereby covering a substantial part of the conveyor and preventing the objects from falling out of the conveyor during transport. The lower part is resiliently attached to the upper part adjacently to the first pulley, thereby preventing a plurality of objects from aggregating in the loading area at the first pulley. Furthermore, the conveyor cover has two symmetrical members rotationally attached to its lower part.

9 Claims, 4 Drawing Sheets

NON-HORIZONTAL CONVEYOR FOR FEEDING OBJECTS

TECHNICAL FIELD

The present invention relates to a conveyor for feeding objects, and more particularly a non-horisontal conveyor with a conveyor belt, a first pulley at a first end forming a loading area of the conveyor, and a second pulley at a second end forming a feeding area of the conveyor.

DESCRIPTION OF THE PRIOR ART

Non-horisontal conveyors with conveyor belts are well-known in the technical field and have been widely used.

The main problem with such conveyors is that when the conveyors are constructed or mounted relatively steep, the transported objects have a tendency to tumble out of the conveyors during transport or create aggregates in loading areas of the conveyors.

SUMMARY OF THE INVENTION

The main aims of the present invention are to reduce the tumbling of objects out of a conveyor, and to increase the feeding capacity by splitting or breaking up aggregates of objects created in a loading area of the conveyor.

These aims are achieved by a conveyor for feeding objects, comprising a conveyor belt, a first pulley at a first end forming a loading area of the conveyor, and a second pulley at a second end forming a feeding area of the conveyor. The conveyor further comprises a conveyor cover having an upper part and a lower part, wherein the upper part extends from the second pulley towards the first pulley, thereby covering a substantial part of the conveyor and preventing the objects from falling out of the conveyor during transport. Furthermore, the lower part is resiliently attached to the upper part adjacently to the first pulley, thereby preventing a plurality of objects from aggregating in the loading area at the first pulley.

By providing a non-horisontal conveyor with a conveyor cover according to the invention, the following advantages are obtained: the risk of having objects tumbling or falling out of the conveyor during transport is reduced; the feeding capacity is increased, and the elimination of object aggregation in the loading area of the conveyor is enhanced.

BRIEF DESCRIPTION OF THE DRAWINGS

The present invention will now be described in further detail, reference being made to the accompanying drawings, in which.

DETAILED DESCRIPTION OF THE INVENTION

In an essentially horisontal conveyor for transporting objects or masses, the objects or masses are loaded on the conveyor at one end forming a loading area, transported along the conveyor and unloaded at the other end forming a feeding area. The objects or masses can be automatically loaded onto the conveyor through a chute or the like, by a machine, such as a tractor or the like operated by a person, or by an operator using a shovel or the like, or by another conveyor. Such a conveyor with an essentially horisontal alignment is fairly simple to control regarding the risk of having objects or masses falling or tumbling out of the conveyor or creating jams or deadlocks due to aggregates forming in the loading area. Conveyors, which are constructed or mounted non-horisontally, i e relatively steep, give a greater risk of having objects or masses falling or tumbling out of the conveyor, or creating jams at the loading area, whereby the feeding capacity of the conveyor is reduced.

This type of conveyor could be used in any application where objects are transported, e g in a coin handling apparatus for sorting and/or counting a plurality of coins. The coin handling apparatus 1 used as an example in this description is described in the PCT-application WO99/33030, which is fully incorporated herein by reference. In such an apparatus 1, the coins are sorted along a path with at least two off-sorting stations and a rotatable carrier or sorting device for carrying the coins along the sorting path. The sorting device further comprises a first rotatable means with a first surface and a second rotatable means with a second surface. The first and second surfaces are arranged to rotate at essentially the same speed and are arranged to engage the coins therebetween, thereby transporting the coins essentially frictionless along the sorting path.

Figure 1:
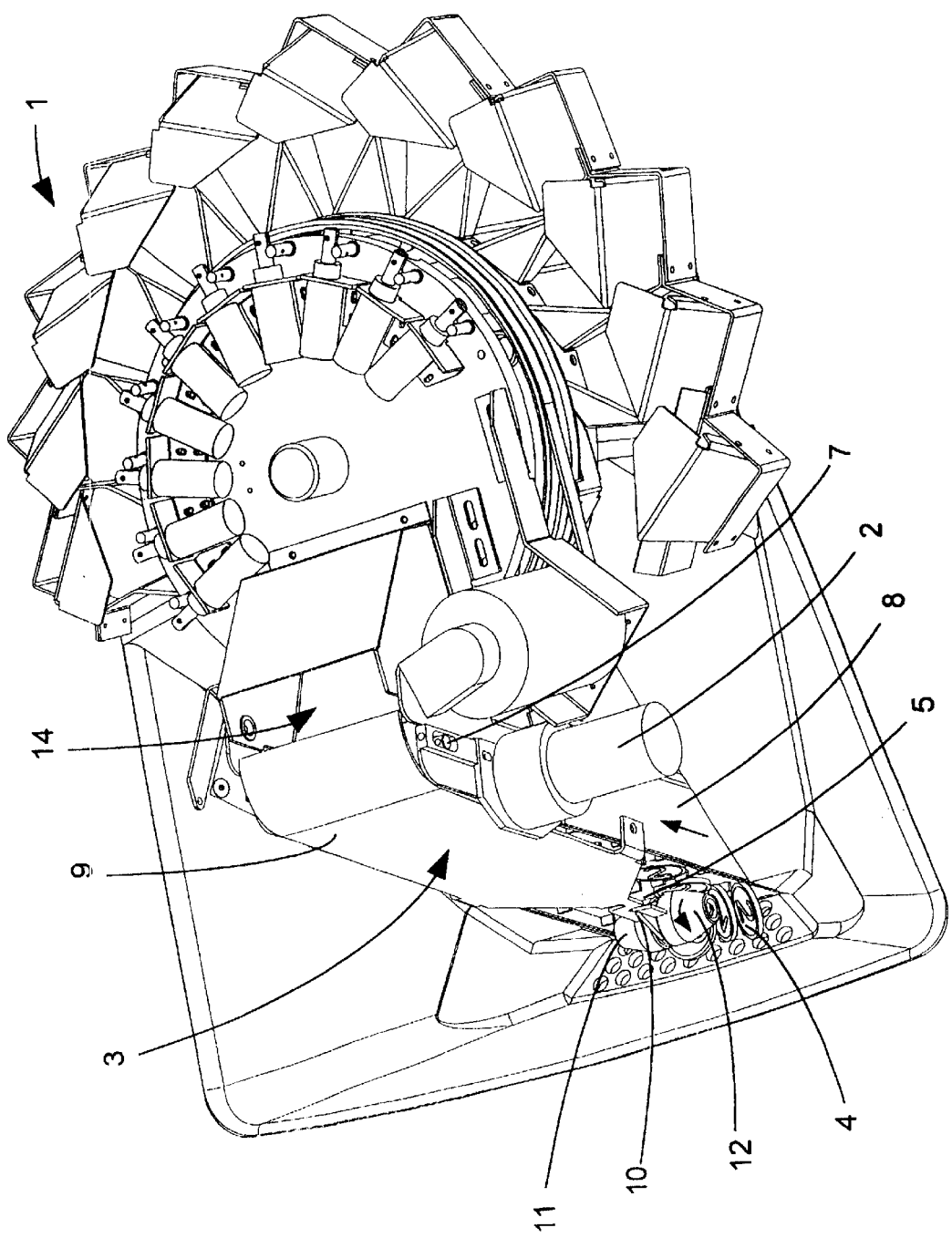
FIG. 1 is a perspective view of a preferred embodiment of a conveyor and a conveyor cover according to the invention, mounted on a coin handling apparatus.

FIG. 1 illustrates a coin handling apparatus 1 having a non-horisontal conveyor 2 with a conveyor cover 3 according to a preferred embodiment of the invention. The non-horisontal conveyor 2 for feeding objects 4 comprises a conveyor belt 5, a first pulley 6 (shown in FIG. 4) at a first end forming a loading area 13 (also shown in FIG. 4) of the conveyor, and a second pulley 7 (only the centre suspension of this pulley can be seen) at a second end forming a feeding area 14 of the conveyor. Furthermore, the conveyor cover 3 has an upper part 9 and a lower part 10, wherein the upper part extends from the second pulley 7 towards the first pulley 6, thereby covering a substantial part of the conveyor 2 and preventing the objects 4 from falling out of the conveyor during transport. The lower part 10 is resiliently attached to the upper part 9 adjacently to the first pulley 6, thereby preventing a plurality of objects from aggregating in the loading area near the first pulley. The conveyor 2 moves disc-shaped objects 4, e g coins, on its conveyor belt 5 from the loading area 13, which receives deposited objects, to the feeding area 14 and into the apparatus 1.

The lower part 10 has two symmetrical frustoconical members 11, 12 rotationally attached to it. These members are oriented with their longitudinal axes a distance from the longitudinal axes of the conveyor pulleys 6, 7, wherein each member 11, 12 is mounted on an axle 15, protruding from the lower part 10 through the centre axis of each member, and located adjacent the loading area 13 of the conveyor 2. The members are suspended with bearings (not shown) on each axle so that they can rotate. The lower part 10 splits or breaks up aggregates of objects forming in the loading area 13 and creating jams or deadlocks for the conveyor 2, and the lower part 10 simultaneously grips the objects by the aid of the conical shape of the members 11, 12 and the resilient function of the lower part 10. The objects then move or "climb" from an upright position, perpendicular to the conveyor belt 5, to a position lying flat down in contact with the belt. After that the objects 4 are moved upwards by the conveyor from the first pulley 6 to the second pulley 7. The belt 5 vibrates to some extent during this movement, thereby creating a force that pushes or throws the objects out of the conveyor back to the loading area 13 adjacent the first pulley 6. This drawback is reduced by the upper part 9 of the conveyor cover 3 that covers a substantial part of the conveyor, thereby preventing the objects from tumbling or falling out and back into the loading area.

Figure 2:
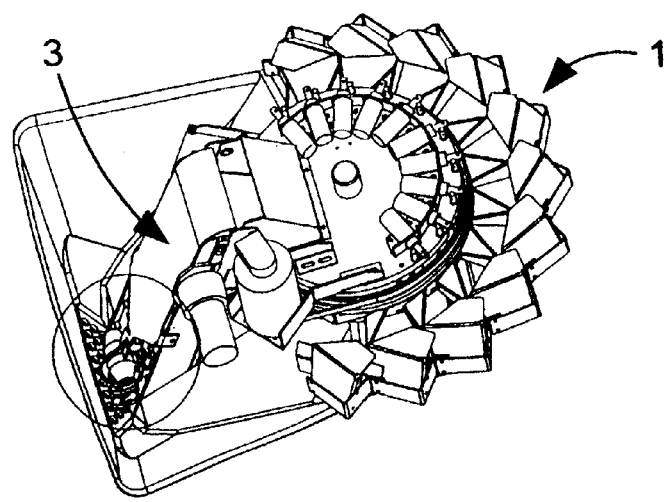
FIG. 2 is a perspective view of the embodiment shown in FIG. 1 with an enlargement of one end of the conveyor cover.
Figure 2:
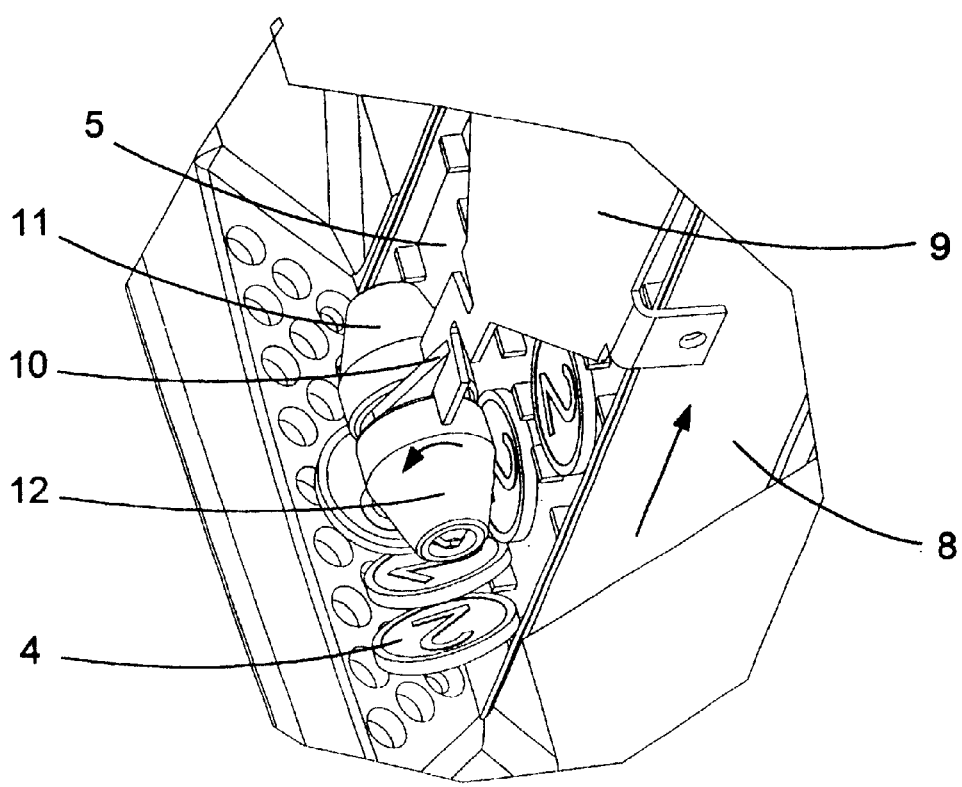

FIG. 2 discloses a perspective view of the apparatus 1 shown in FIG. 1 and an enlargement disclosing the lower part of the cover 3 near the first pulley 6 in more detail. The members 11, 12 are in contact with the conveyor 2 and the objects 4, here shown as coins, during operation of the apparatus 1. The members rotate counter-clockwise, the direction of rotation being shown by an arrow on member 12 in FIGS. 1 and 2, as the conveyor operates in the direction of movement shown by another arrow on frame 8 in FIGS. 1 and 2. The objects come in contact with the surface of the members, whereby the objects will move or "climb" due to both the friction against the members and the clamping force provided by the resilient lower part 10 of the cover 3. After this the objects are oriented in a position lying flat down on the conveyor belt 5, until they are unloaded in the feeding area 14 near the second pulley 7.

Figure 3:
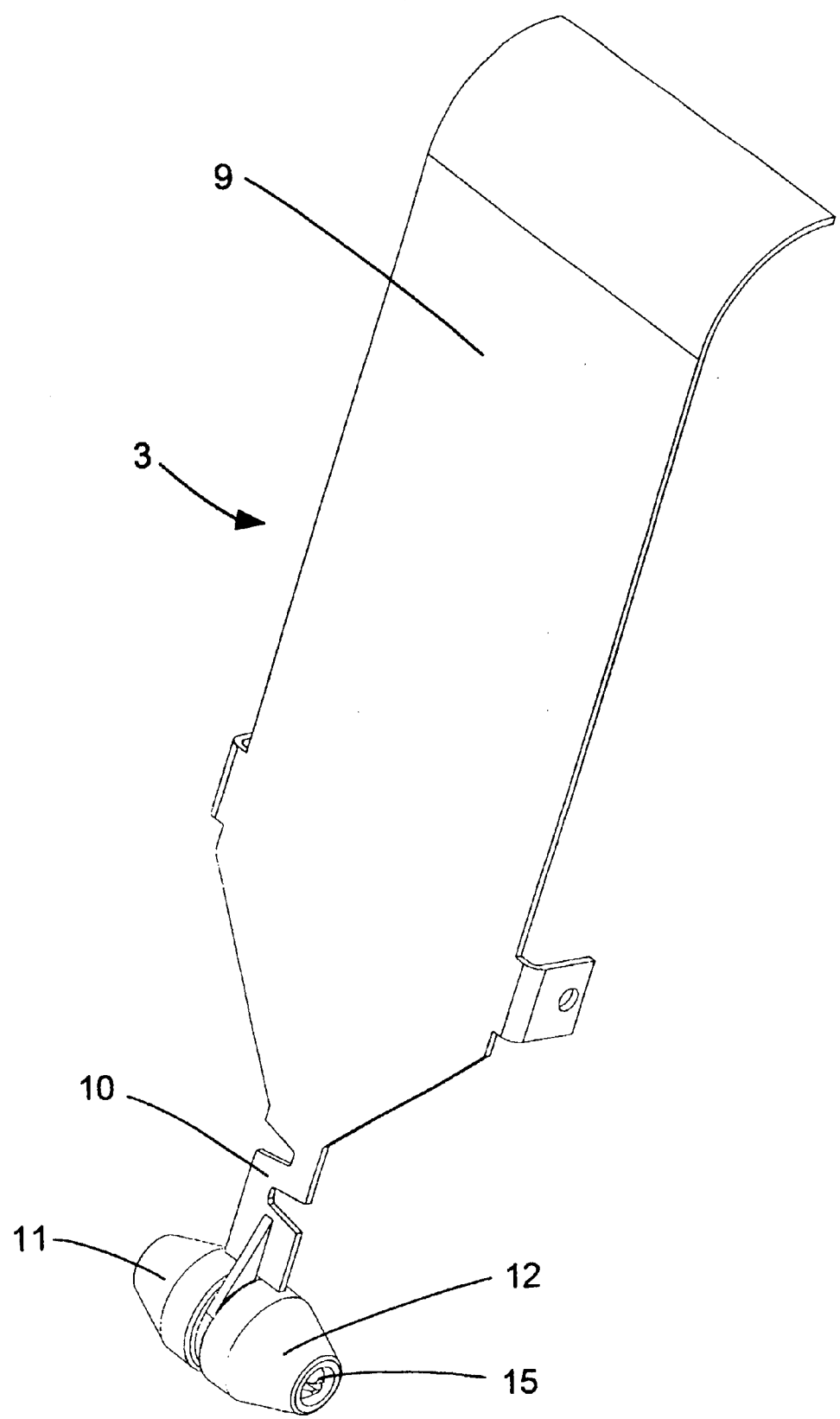
FIG. 3 is a perspective view of the conveyor cover in detail.

FIG. 3 shows the conveyor cover 3 in detail. The upper part 9 prolongs into the resilient lower part 10, to which each of the members 11, 12 is rotationally attached by an axle 15.

Figure 4:
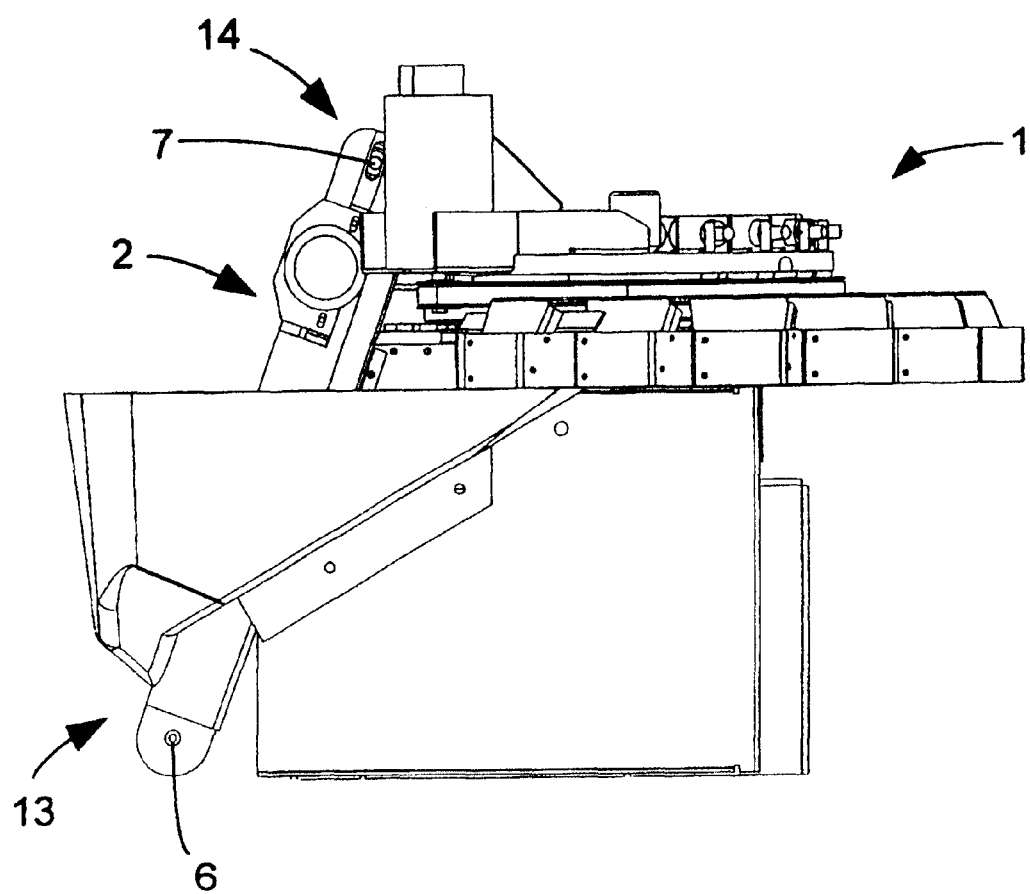
FIG. 4 is a side view of the embodiment shown in FIG. 1.

A side view of the coin handling apparatus 1 is shown in FIG. 4. The positions of the loading and feeding areas 13, 14 of the conveyor 2, and the first and second pulleys 6, 7, are shown more clearly here.

The position and the angle of the conveyor 2 could be altered in relation to the illustrated configuration, e g the angle in relation to the horisontal plane could be bigger or smaller, and the conveyor could be arranged in any other position around or along the vertical centre axis of the apparatus 1, only limited by the fact that the feeding area 14 must be above the intake of the apparatus.

The bearings associated with the members 11, 12 could be slide bearings, ball or angular bearings or the like. The members have a frustoconical shape but could also have a four-sided shape, e g as a tetrahedron, or another shape with more or less sides and a narrowing cross-section in the longitudinal direction. They could also have a whole conical shape instead of just a frustrum of a cone. The conveyor cover 3 is made in a single piece except from the members 11, 12 but could be made of separate parts attached together before mounted onto an apparatus. The lower part 10 has a shape that gives a spring function but could instead be a separate spring, in the form of a helical spring or leaf spring, attached between the members and the upper part 9 of the conveyor cover 3. In this application the cover is made of metal but could be made of any other material fulfilling the demands, e g a plastic material or a combination of several materials. The cover is attached by screws on the conveyor 2 but could also be attached by dowels or pins, a snap or clasp function given by a certain shape, or some kind of brackets.

I claim:

1. A non-horizontal conveyor for feeding objects, comprising:

a conveyor belt;

a first pulley at a first end forming a loading area of the conveyor;

a second pulley at a second end forming a feeding area of the conveyor;

a conveyor cover having an upper part and a lower part, and members attached to the lower part, wherein the upper part extends from the second pulley towards the first pulley, thereby covering a substantial part of the conveyor and preventing the objects from falling out of the conveyor during transport, and wherein the lower part is resiliently attached to the upper part adjacently to the first pulley, thereby together with the members preventing a plurality of objects from aggregating in the loading area at the first pulley.

2. The non-horizontal conveyor according to claim 1, wherein each of the transported objects have a substantially disc-shaped form.

3. The non-horizontal conveyor according to claim 2, wherein the transported objects are coins.

4. The non-horizontal conveyor according to claim 1, wherein the conveyor cover has two symmetrical members rotationally attached to the lower part of the conveyor cover.

5. The non-horizontal conveyor according to claim 4, wherein said members are oriented with their longitudinal axes a distance from and in parallel to the longitudinal axes of the conveyor pulleys, wherein each member is mounted on an axle, protruding from the lower part through the center axis of each member, and located adjacent the first end of the conveyor.

6. The non-horizontal conveyor according to claim 5, wherein each of said members has a frustoconical shape.

7. The non-horizontal conveyor according to claim 1, wherein the upper part of the conveyor cover forms a substantially even upper surface towards the conveyor belt.

8. The non-horizontal conveyor according to claim 6, wherein the members are in contact with the belt in said loading area of the conveyor.

9. A coin handling apparatus, comprising:

a non-horizontal conveyor for feeding objects;

a conveyor belt;

a first pulley at a first end forming a loading area of the conveyor;

a second pulley at a second end forming a feeding area of the conveyor;

a conveyor cover having an upper part and a lower part, and members attached to the lower part, wherein the upper part extends from the second pulley towards the first pulley, thereby covering a substantial part of the conveyor and preventing the objects from falling out of the conveyor during transport, and wherein the lower part is resiliently attached to the upper part adjacently to the first pulley, thereby together with the members preventing a plurality of objects from aggregating in the loading area at the first pulley.

\* \* \* \* \*